(12) United States Patent
Koda et al.

(10) Patent No.: US 11,590,799 B2
(45) Date of Patent: Feb. 28, 2023

(54) HEAVY-DUTY TIRE RUBBER COMPOSITIONS AND TIRES

(71) Applicant: KURARAY CO., LTD., Kurashiki (JP)

(72) Inventors: Daisuke Koda, Kamisu (JP); Hiroshi Kanbara, Kamisu (JP)

(73) Assignee: KURARAY CO., LTD., Kurashiki (JP)

( * ) Notice: Subject to any disclaimer, the term of this patent is extended or adjusted under 35 U.S.C. 154(b) by 389 days.

(21) Appl. No.: 16/643,160

(22) PCT Filed: Aug. 29, 2018

(86) PCT No.: PCT/JP2018/031916
§ 371 (c)(1),
(2) Date: Feb. 28, 2020

(87) PCT Pub. No.: WO2019/044893
PCT Pub. Date: Mar. 7, 2019

(65) Prior Publication Data
US 2020/0254816 A1 Aug. 13, 2020

(30) Foreign Application Priority Data
Sep. 1, 2017 (JP) .............................. JP2017-168629

(51) Int. Cl.
| | | |
|---|---|---|
| *C08L 7/00* | (2006.01) | |
| *C08L 9/00* | (2006.01) | |
| *B60C 1/00* | (2006.01) | |
| *B60C 15/06* | (2006.01) | |
| *C08F 230/08* | (2006.01) | |
| *C08F 236/06* | (2006.01) | |
| *C08F 236/08* | (2006.01) | |
| *C08K 3/04* | (2006.01) | |
| *C08K 3/36* | (2006.01) | |
| *C08L 25/10* | (2006.01) | |

(52) U.S. Cl.
CPC ............ *B60C 1/0016* (2013.01); *B60C 15/06* (2013.01); *C08F 230/08* (2013.01); *C08F 236/06* (2013.01); *C08F 236/08* (2013.01); *C08K 3/04* (2013.01); *C08K 3/36* (2013.01); *C08L 7/00* (2013.01); *C08L 25/10* (2013.01); *B60C 2200/06* (2013.01); *C08F 2810/30* (2013.01); *C08K 2201/003* (2013.01); *C08L 2205/02* (2013.01); *C08L 2312/00* (2013.01)

(58) Field of Classification Search
CPC ............ C08F 7/00; C08F 9/00; C08F 19/006; C08K 3/04; C08K 3/36
See application file for complete search history.

(56) References Cited

U.S. PATENT DOCUMENTS

| | | | | |
|---|---|---|---|---|
| 4,711,285 A | * | 12/1987 | Ogawa | ............... B60C 15/06 264/108 |
| 5,360,047 A | * | 11/1994 | Fujiwara | ............... B60C 3/04 152/534 |
| 9,926,438 B2 | | 3/2018 | Takahashi et al. | |
| 10,370,525 B2 | | 8/2019 | Koda et al. | |
| 11,034,821 B2 | * | 6/2021 | Maeda | ................ C08L 15/00 |
| 11,124,631 B2 | * | 9/2021 | Maeda | ................ C08L 15/00 |
| 2015/0119528 A1 | | 4/2015 | Liang et al. | |
| 2017/0009065 A1 | | 1/2017 | Koda et al. | |
| 2017/0073509 A1 | | 3/2017 | Koda et al. | |
| 2017/0218185 A1 | | 8/2017 | Takahashi et al. | |
| 2019/0194429 A1 | | 6/2019 | Maeda et al. | |
| 2019/0218376 A1 | | 7/2019 | Maeda et al. | |
| 2020/0207956 A1 | * | 7/2020 | Kanbara | ............... B60C 1/0016 |
| 2020/0207957 A1 | * | 7/2020 | Kanbara | ................ C08C 19/25 |
| 2020/0332089 A1 | * | 10/2020 | Kanbara | ................ C08L 15/00 |
| 2020/0332090 A1 | * | 10/2020 | Koda | ................... C08L 9/00 |
| 2020/0392313 A1 | * | 12/2020 | Kanbara | ............... B60C 1/0016 |

FOREIGN PATENT DOCUMENTS

| | | | |
|---|---|---|---|
| CN | 103102706 A | 5/2013 | |
| CN | 103539949 A | 1/2014 | |
| CN | 104610622 A | 5/2015 | |
| CN | 106068302 A | 11/2016 | |
| CN | 106164160 A | 11/2016 | |
| EP | 2 818 507 A1 | 12/2014 | |
| EP | 3 118 251 A1 | 1/2017 | |
| JP | 2001-81239 A | 3/2001 | |
| JP | 2002-114874 A | 4/2002 | |
| JP | 2004-262170 A | 9/2004 | |
| JP | 2007-137941 A | 6/2007 | |
| JP | 2010-126671 A | 6/2010 | |

(Continued)

OTHER PUBLICATIONS

Extended European Search Report dated Mar. 18, 2021 in European Patent Application No. 18852389.8, 5 pages.
Combined Chinese Office Action and Search Report dated Aug. 6, 2021 in corresponding Chinese Patent Application No. 201880056279.1 (with English Translation of Category of Cited Documents), 8 pages.
International Search Report and Written Opinion dated Nov. 13, 2018, in PCT/JP2018/031916, 23 pages.

*Primary Examiner* — Rip A Lee

(74) *Attorney, Agent, or Firm* — Oblon, McClelland, Maier & Neustadt, L.L.P.

(57) ABSTRACT

The invention provides a heavy-duty tire rubber composition excellent in wet grip performance and steering stability, and a tire tread, a bead filler, a tire belt and a heavy-duty tire which each partially include the composition. The heavy-duty tire rubber composition includes 100 parts by mass of a solid rubber (A), 0.1 to 50 parts by mass of a modified liquid diene rubber (B) having a functional group derived from a silane compound with a specific structure, and 20 to 200 parts by mass of a filler (C), the modified liquid diene rubber (B) satisfying the following (i) and (ii): (i) the weight average molecular weight (Mw) is not less than 1,000 and not more than 120,000, and (ii) the vinyl content is not less than 30 mol % and less than 70 mol %.

12 Claims, No Drawings

(56) References Cited

FOREIGN PATENT DOCUMENTS

| | | |
|---|---|---|
| JP | 2011-132298 A | 7/2011 |
| JP | 2011-231295 A | 11/2011 |
| JP | 2013-23568 A | 2/2013 |
| JP | 2013-185090 A | 9/2013 |
| JP | 2014-24912 A | 2/2014 |
| JP | 2015-218237 A | 12/2015 |
| WO | WO 2018/043699 A1 | 3/2018 |
| WO | WO 2018/043700 A1 | 3/2018 |

* cited by examiner

HEAVY-DUTY TIRE RUBBER COMPOSITIONS AND TIRES

TECHNICAL FIELD

The present invention relates to a heavy-duty tire rubber composition, and to a tire tread, a bead filler, a tire belt and a heavy-duty tire which each at least partially include the composition.

BACKGROUND ART

Tires for heavy-duty vehicles such as trucks and buses (heavy-duty tires) are required to be excellent in brake performance on dry roads (dry grip performance) and in brake performance on wet roads (wet grip performance) and also to be excellent in abrasion resistance. A general approach to attaining enhanced abrasion resistance is to use a rubber composition including carbon black or silica as a rubber reinforcing agent. Unfortunately, such a rubber composition is so viscous and is poorly processable. Thus, process oils, liquid polymers, etc. are used as processability improvers. However, conventional processability improvers, although offering better processability, cause a problem that wet grip performance, steering stability and abrasion resistance are not sufficiently improved.

To improve the above characteristics in a well-balanced manner, Patent Literature 1 describes a high-performance heavy-duty tire rubber composition which includes at least one selected from the group consisting of natural rubbers and diene-based synthetic rubbers, carbon black, and an amphoteric compound containing acidic and basic functional groups. Patent Literature 2 describes a rubber composition obtained by mixing a rubber component, a softener and carbon black in a specific manner.

Further, Patent Literature 3 describes a rubber composition which includes 100 parts by mass of a rubber component including a styrene butadiene rubber, not less than 10 parts by mass of a liquid styrene butadiene rubber having a weight average molecular weight of 1000 to 5000 and a hydrogenation ratio of 40 to 60%, and not less than 5 parts by mass of an aromatic petroleum resin. Patent Literature 4 describes a heavy-duty tire rubber composition which includes 100 parts by mass of a diene rubber, the diene rubber including 70 mass % or more styrene butadiene rubber with a styrene content of not less than 30 mass %, 80 to 150 parts by mass of a specific carbon black, 10 to 50 parts by mass of a polyisoprene having a specific number average molecular weight, and 10 to 50 parts by mass of an aromatic modified terpene resin having a specific softening point.

Further, Patent Literature 5 describes a heavy-duty tire rubber composition including a specific styrene butadiene rubber and carbon black.

CITATION LIST

Patent Literature

Patent Literature 1: JP-A-2014-024912
Patent Literature 2: JP-A-2001-081239
Patent Literature 3: JP-A-2007-137941
Patent Literature 4: JP-A-2010-126671
Patent Literature 5: JP-A-2013-185090

SUMMARY OF INVENTION

Technical Problem

Tires which include the rubber compositions described in Patent Literatures 1 to 5 exhibit improved wet grip performance and steering stability, but their performances are still not satisfactory and need further improvements.

The present invention has been made in light of the circumstances discussed above, and provides a heavy-duty tire rubber composition excellent in wet grip performance and steering stability, and a tire tread and a heavy-duty tire which each partially include the composition.

Solution to Problem

After extensive studies, the present inventors have found that a rubber composition including specific components such as a specific modified liquid diene rubber gives articles such as tire treads which attain excellent wet grip performance and steering stability. The present invention has been completed based on the finding.

Specifically, the present invention pertains to [1] to [13] described below.

[1] A heavy-duty tire rubber composition comprising 100 parts by mass of a solid rubber (A), 0.1 to 50 parts by mass of a modified liquid diene rubber (B) having a functional group derived from a silane compound represented by the formula (1) below, and 20 to 200 parts by mass of a filler (C),
the modified liquid diene rubber (B) satisfying the following (i) and (ii):
(i) the weight average molecular weight (Mw) is not less than 1,000 and not more than 120,000, and
(ii) the vinyl content is not less than 30 mol % and less than 70 mol %,

[Chem. 1]

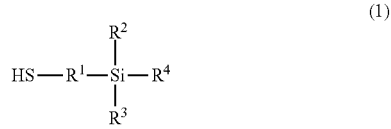

(1)

wherein $R^1$ is a $C_{1-6}$ divalent alkylene group, and $R^2$, $R^3$ and $R^4$ are each independently a methoxy group, an ethoxy group, a phenoxy group, a methyl group, an ethyl group or a phenyl group, with the proviso that at least one of $R^2$, $R^3$ and $R^4$ is a methoxy group, an ethoxy group or a phenoxy group.

[2] The heavy-duty tire rubber composition described in [1], wherein the melt viscosity of the modified liquid diene rubber (B) at 38° C. is 0.1 to 4,000 Pa·s.

[3] The heavy-duty tire rubber composition described in [1] or [2], wherein the modified liquid diene rubber (B) is a polymer comprising a monomer unit derived from isoprene and/or butadiene.

[4] The heavy-duty tire rubber composition described in any one of [1] to [3], wherein the filler (C) is at least one selected from silicas and carbon blacks.

[5] The heavy-duty tire rubber composition described in [4], wherein the filler (C) is at least one selected from carbon blacks having an average particle diameter of 5 to 100 nm and silicas having an average particle diameter of 0.5 to 200 nm.

[6] The heavy-duty tire rubber composition described in [4] or [5], wherein the filler (C) is silica, and the rubber composition further comprises 0.1 to 30 parts by mass of a silane coupling agent per 100 parts by mass of the silica.

[7] The heavy-duty tire rubber composition described in any one of [1] to [6], wherein the solid rubber (A) is one or more selected from natural rubbers, styrene butadiene rubbers, butadiene rubbers and isoprene rubbers.

[8] The heavy-duty tire rubber composition described in any one of [1] to [7], wherein the solid rubber (A) comprises 60 mass % or more natural rubber.

[9] A crosslinked product obtained by crosslinking the heavy-duty tire rubber composition described in any one of [1] to [8].

[10] A tire tread comprising, as at least a portion of the tire tread, the heavy-duty tire rubber composition described in any one of [1] to [8].

[11] A bead filler comprising, as at least a portion of the bead filler, the heavy-duty tire rubber composition described in any one of [1] to [8].

[12] A tire belt comprising, as at least a portion of the tire belt, the heavy-duty tire rubber composition described in any one of [1] to [8].

[13] A heavy-duty tire comprising, as at least a portion of the heavy-duty tire, the heavy-duty tire rubber composition described in any one of [1] to [8].

Advantageous Effects of Invention

The heavy-duty tire rubber composition according to the present invention can give heavy-duty tires which have excellent wet grip performance and good steering stability. The tire tread, the bead filler, the tire belt and the heavy-duty tire provided according to the present invention include the composition as portions thereof.

DESCRIPTION OF EMBODIMENTS

[Solid Rubbers (A)]

The solid rubber (A) used in the heavy-duty tire rubber composition of the invention is a rubber that can be handled as a solid at 20° C. The Moony viscosity $ML_{1+4}$ of the solid rubber (A) at 100° C. is usually in the range of 20 to 200. This rubber is usually selected from at least one of synthetic rubbers and natural rubbers.

Examples of the solid rubbers (A) include synthetic rubbers such as styrene butadiene rubbers (hereinafter, also written as "SBRs"), butadiene rubbers, isoprene rubbers, butyl rubbers, halogenated butyl rubbers, ethylene propylene diene rubbers, butadiene acrylonitrile copolymer rubbers, chloroprene rubbers, acrylic rubbers, fluororubbers and urethane rubbers; and natural rubbers. Of these solid rubbers (A), natural rubbers, SBRs, butadiene rubbers and isoprene rubbers are preferable, and natural rubbers and SBRs are more preferable. The solid rubbers (A) may be used singly, or two or more may be used in combination.

To ensure that the obtainable rubber composition and crosslinked products will exhibit desired properties sufficiently, the number average molecular weight (Mn) of the solid rubber (A) is preferably not less than 80,000, and more preferably in the range of 100,000 to 3,000,000. In the present specification, the number average molecular weight is a polystyrene equivalent number average molecular weight measured by gel permeation chromatography (GPC).

The SBRs may be any such rubbers generally used in tire applications. Specifically, those rubbers having a styrene content of 0.1 to 70 mass % are preferable, and the styrene content is more preferably 5 to 60 mass %, and still more preferably 5 to 50 mass %. Further, those rubbers having a vinyl content of 0.1 to 80 mass % are preferable, and those having a vinyl content of 5 to 70 mass % are more preferable.

The vinyl content in the SBRs in the present specification means the content of vinyl group-containing monomer units relative to all the butadiene-derived units contained in the SBR. Similarly, the vinyl content in the solid rubber (A) described later means the content of monomer units which actually have a vinyl group relative to the total amount of units from a monomer which can have a vinyl group depending on the bonding pattern.

The weight average molecular weight (Mw) of the SBRs is preferably 100,000 to 2,500,000, more preferably 150,000 to 2,000,000, and still more preferably 150,000 to 1,500,000. When the weight average molecular weight (Mw) of the SBR is in this range, the heavy-duty tire rubber composition attains enhanced processability and can give tires which exhibit enhanced wet grip performance and improved mechanical strength, abrasion resistance and steering stability. In the present specification, the weight average molecular weight is the polystyrene equivalent weight average molecular weight measured by gel permeation chromatography (GPC).

The glass transition temperature (Tg) of the SBRs measured by differential thermal analysis is preferably −95 to 0° C., more preferably −95 to −5° C., still more preferably −95 to −10° C., further preferably −95 to −15° C., and particularly preferably −95 to −20° C. When the glass transition temperature is in this range, the heavy-duty tire rubber composition exhibits a viscosity that is not excessively high and is handled easily.

SBR which may be used in the invention may be obtained by copolymerizing styrene and butadiene. The SBR production process is not particularly limited and may be any of emulsion polymerization, solution polymerization, gas-phase polymerization and bulk polymerization. Of these production processes, emulsion polymerization and solution polymerization are preferable.

An emulsion-polymerized styrene butadiene rubber (hereinafter, also written as E-SBR) may be produced by a usual emulsion polymerization process that is known or is deemed as known. For example, such a rubber may be obtained by emulsifying and dispersing prescribed amounts of styrene and butadiene monomers in the presence of an emulsifier and emulsion polymerizing the monomers with a radical polymerization initiator.

Examples of the emulsifiers which may be used include long-chain fatty acid salts having 10 or more carbon atoms, and rosin acid salts. Specific examples include potassium salts and sodium salts of fatty acids such as capric acid, lauric acid, myristic acid, palmitic acid, oleic acid and stearic acid.

Usually, water is used as the dispersion medium. The dispersion medium may include a water-soluble organic solvent such as methanol or ethanol as long as the stability during the polymerization is not impaired.

Examples of the radical polymerization initiators include persulfate salts such as ammonium persulfate and potassium persulfate, organic peroxides and hydrogen peroxide.

To control the molecular weight of the E-SBR that is obtained, a chain transfer agent may be used. Examples of the chain transfer agents include mercaptans such as t-dodecylmercaptan and n-dodecylmercaptan; carbon tetrachloride, thioglycolic acid, diterpene, terpinolene, γ-terpinene and α-methylstyrene dimer.

The temperature of the emulsion polymerization may be selected appropriately in accordance with the type of the radical polymerization initiator used. In usual cases, the temperature is preferably 0 to 100° C., and more preferably 0 to 60° C. The polymerization mode may be continuous or batchwise. The polymerization reaction may be terminated by the addition of a polymerization terminator.

Examples of the polymerization terminators include amine compounds such as isopropylhydroxylamine, diethylhydroxylamine and hydroxylamine; quinone compounds such as hydroquinone and benzoquinone; and sodium nitrite.

The termination of the polymerization reaction may be followed by the addition of an antioxidant as required. After the termination of the polymerization reaction, the latex obtained is cleaned of the unreacted monomers as required, and the polymer is coagulated by the addition of a coagulant salt such as sodium chloride, calcium chloride or potassium chloride optionally together with an acid such as nitric acid or sulfuric acid to control the pH of the coagulated system to a predetermined value. The dispersion medium is then separated, thereby recovering the polymer as crumb. The crumb is washed with water, then dehydrated, and dried with a band dryer or the like to give E-SBR. During the coagulation process, the latex may be mixed together with an emulsified dispersion of an extender oil as required, and the rubber may be recovered as an oil-extended rubber. It is noted that an extender oil is not regarded as a component of the solid rubber (A) in the heavy-duty tire rubber composition in the present specification.

Examples of the commercially available E-SBRs include oil-extended styrene butadiene rubber "JSR1723" manufactured by JSR Corporation.

A solution polymerized styrene butadiene rubber (hereinafter, also written as S-SBR) may be produced by a usual solution polymerization process. For example, styrene and butadiene are polymerized in a solvent with an active metal capable of catalyzing anionic polymerization optionally in the presence of a polar compound as desired.

Examples of the solvents include aliphatic hydrocarbons such as n-butane, n-pentane, isopentane, n-hexane, n-heptane and isooctane; alicyclic hydrocarbons such as cyclopentane, cyclohexane and methylcyclopentane; and aromatic hydrocarbons such as benzene and toluene. It is usually preferable to use the solvent in such an amount that the monomer concentration will be 1 to 50 mass %.

Examples of the active metals capable of catalyzing anionic polymerization include alkali metals such as lithium, sodium and potassium; alkaline earth metals such as beryllium, magnesium, calcium, strontium and barium; and lanthanoid rare earth metals such as lanthanum and neodymium. Of these active metals, alkali metals and alkaline earth metals are preferable, and alkali metals are more preferable. Of the alkali metals, organoalkali metal compounds are more preferably used.

Examples of the organoalkali metal compounds include organomonolithium compounds such as n-butyllithium, sec-butyllithium, t-butyllithium, hexyllithium, phenyllithium and stilbenelithium; polyfunctional organolithium compounds such as dilithiomethane, 1,4-dilithiobutane, 1,4-dilithio-2-ethylcyclohexane and 1,3,5-trilithiobenzene; sodium naphthalene and potassium naphthalene. In particular, organolithium compounds are preferable, and organomonolithium compounds are more preferable. The amount in which the organoalkali metal compounds are used may be determined appropriately in accordance with the desired molecular weight of S-SBR. The organoalkali metal compound may be used in the form of an organoalkali metal amide by being subjected to a reaction with a secondary amine such as dibutylamine, dihexylamine or dibenzylamine.

The polar compounds are not particularly limited as long as the compounds do not deactivate the anionic polymerization reaction and are generally used for the purposes of controlling the microstructure of butadiene units and controlling the distribution of styrene in copolymer chains. Examples include ether compounds such as dibutyl ether, tetrahydrofuran and ethylene glycol diethyl ether; tertiary amines such as tetramethylethylenediamine and trimethylamine; alkali metal alkoxides; and phosphine compounds.

The temperature of the polymerization reaction is usually in the range of −80 to 150° C., preferably 0 to 100° C., and more preferably 30 to 90° C. The polymerization mode may be batchwise or continuous. To enhance the random copolymerizability of styrene and butadiene, it is preferable to supply styrene and butadiene into the reaction liquid continuously or intermittently so that styrene and butadiene in the polymerization system will have a specific composition ratio.

The polymerization reaction may be terminated by the addition of an alcohol such as methanol or isopropanol as a polymerization terminator. After the termination of the polymerization reaction, the target S-SBR may be recovered by separating the solvent from the polymerization solution by a method such as direct drying or steam stripping. The polymerization solution may be mixed together with an extender oil before the removal of the solvent, and the rubber may be recovered as an oil-extended rubber.

As long as the advantageous effects of the invention are not impaired, the SBR may be a modified SBR obtained by introducing functional groups into SBR. Examples of the functional groups include amino groups, alkoxysilyl groups, hydroxyl groups, epoxy groups and carboxyl groups.

For example, the modified SBR may be produced by adding, before the addition of the polymerization terminator, an agent capable of reacting with active ends of the polymer, for example, a coupling agent such as tin tetrachloride, tetrachlorosilane, dimethyldichlorosilane, dimethyldiethoxysilane, tetramethoxysilane, tetraethoxysilane, 3-aminopropyltriethoxysilane, tetraglycidyl-1,3-bisaminomethylcyclohexane or 2,4-tolylene diisocyanate, a chain end-modifying agent such as 4,4'-bis(diethylamino)benzophenone or N-vinylpyrrolidone, or any of the modifying agents described in JP-A-2011-132298. In the modified SBR, the functional groups may be introduced at polymer ends or polymer side chains.

Examples of the isoprene rubbers which may be used include commercially available isoprene rubbers polymerized with Ziegler catalysts such as titanium tetrahalide-trialkylaluminum systems, diethylaluminum chloride-cobalt systems, trialkylaluminum-boron trifluoride-nickel systems and diethylaluminum chloride-nickel systems; lanthanoid rare earth metal catalysts such as triethylaluminum-organic acid neodymium-Lewis acid systems; or organoalkali metal compounds similarly to the S-SBRs. Ziegler-catalyzed isoprene rubbers are preferable because they have a high cis content. Use may be made of ultrahigh cis isoprene rubbers obtained using lanthanoid rare earth metal catalysts.

The vinyl content in the isoprene rubbers is preferably not more than 50 mass %, more preferably not more than 40 mass %, and still more preferably not more than 30 mass %. If the vinyl content exceeds 50 mass %, the rolling resistance performance tends to deteriorate. The lower limit of the vinyl content is not particularly limited. The glass transition temperature, although variable depending on the vinyl content, is preferably not more than −20° C., and more preferably not more than −30° C.

The weight average molecular weight (Mw) of the isoprene rubbers is preferably 90,000 to 2,000,000, and more preferably 150,000 to 1,500,000. This Mw ensures that high processability and mechanical strength are obtained.

As long as the advantageous effects of the invention are not impaired, the isoprene rubbers may have branched partial structures or polar functional groups that are introduced by using polyfunctional modifiers, for example, tin tetrachloride, silicon tetrachloride, alkoxysilanes having an epoxy group in the molecule, or amino group-containing alkoxysilanes.

Examples of the butadiene rubbers which may be used include commercially available butadiene rubbers polymerized with Ziegler catalysts such as titanium tetrahalide-trialkylaluminum systems, diethylaluminum chloride-cobalt systems, trialkylaluminum-boron trifluoride-nickel systems and diethylaluminum chloride-nickel systems; lanthanoid rare earth metal catalysts such as triethylaluminum-organic acid neodymium-Lewis acid systems; or organoalkali metal compounds similarly to the S-SBRs. Ziegler-catalyzed butadiene rubbers are preferable because they have a high cis content. Use may be made of ultrahigh cis butadiene rubbers (for example, 95% or more cis content) obtained using lanthanoid rare earth metal catalysts.

The vinyl content in the butadiene rubbers is preferably not more than 50 mass %, more preferably not more than 40 mass %, and still more preferably not more than 30 mass %. If the vinyl content exceeds 50 mass %, the rolling resistance performance (low fuel consumption performance) tends to deteriorate. The lower limit of the vinyl content is not particularly limited. The glass transition temperature, although variable depending on the vinyl content, is preferably not more than −40° C., and more preferably not more than −50° C.

The weight average molecular weight (Mw) of the butadiene rubbers is preferably 90,000 to 2,000,000, and more preferably 150,000 to 1,500,000. When the Mw is in this range, the heavy-duty tire rubber composition attains enhanced processability, and tires including the heavy-duty tire rubber composition as a portion thereof achieve enhancements in ice grip performance and steering stability.

As long as the advantageous effects of the invention are not impaired, the butadiene rubbers may have branched partial structures or polar functional groups that are introduced by using polyfunctional modifiers, for example, tin tetrachloride, silicon tetrachloride, alkoxysilanes having an epoxy group in the molecule, or amino group-containing alkoxysilanes.

At least one of the SBRs, the isoprene rubbers and the butadiene rubbers may be used in combination with one, or two or more of, for example, butyl rubbers, halogenated butyl rubbers, ethylene propylene diene rubbers, butadiene acrylonitrile polymer rubbers and chloroprene rubbers. These rubbers may be produced by any methods without limitation, or may be purchased from the market.

Examples of the natural rubbers include those natural rubbers, high-purity natural rubbers and modified natural rubbers such as epoxidized natural rubbers, hydroxylated natural rubbers, hydrogenated natural rubbers and grafted natural rubbers generally used in the tire industry, with specific examples including TSRs (technically specified rubbers) such as SMRs (TSRs from Malaysia), SIRs (TSRs from Indonesia) and STRs (TSRs from Thailand), and RSSs (ribbed smoked sheets). In particular, SMR 20, STR 20 and RSS #3 are preferable from the points of view of uniform quality and high availability. The natural rubbers may be used singly, or two or more may be used in combination.

The solid rubber (A) used in the present invention preferably includes 60 mass % or more natural rubber. When the solid rubber (A) includes 60 mass % or more natural rubber, tires including the heavy-duty tire rubber composition as portions thereof attain enhancements in mechanical strength and abrasion resistance. From the above point of view, the proportion of the natural rubber in the solid rubber (A) is more preferably not less than 70 mass %, still more preferably not less than 80 mass %, further preferably not less than 90 mass %, and particularly preferably not less than 95 mass %.

[Modified Liquid Diene Rubbers (B)]

The modified liquid diene rubber (B) used in the inventive heavy-duty tire rubber composition is a liquid polymer which has a weight average molecular weight (Mw) in the range of not less than 1,000 and not more than 120,000, has a vinyl content of not less than 30 mol % and less than 70 mol %, and has a functional group derived from a silane compound represented by the aforementioned formula (1). In the heavy-duty tire rubber composition of the present invention, the modified liquid diene rubber (B) enhances the dispersibility of the filler (C) in the rubber composition to realize a state that is ideal for the desired enhancements in properties. Further, the above configuration allows the rubber composition used as, for example, tire treads or the like to attain enhancements in wet grip performance and steering stability.

An unmodified liquid diene rubber (B') that is a raw material for the modified liquid diene rubber (B) contains conjugated diene units as monomer units constituting the polymer. Examples of the conjugated dienes include butadiene; isoprene; and conjugated dienes (b1) except butadiene and isoprene, such as 2,3-dimethylbutadiene, 2-phenylbutadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene and chloroprene. The conjugated diene units in the unmodified liquid diene rubber (B') preferably include monomer units derived from butadiene and/or isoprene.

The unmodified liquid diene rubber (B') serving as a raw material for the modified liquid diene rubber (B) preferably contains monomer units derived from butadiene and/or isoprene in an amount of not less than 50 mass % relative to all the monomer units constituting the polymer. The total content of butadiene units and isoprene units is preferably 60 to 100 mass %, and more preferably 70 to 100 mass % relative to all the monomer units forming the unmodified liquid diene rubber (B').

In addition to the butadiene units and the isoprene units, the unmodified liquid diene rubber (B') may include additional monomer units such as units from the aforementioned conjugated dienes (b1) other than butadiene and isoprene, and units from aromatic vinyl compounds (b2).

Examples of the aromatic vinyl compounds (b2) include styrene, α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene and divinylbenzene. Of these aromatic vinyl compounds, styrene, α-methylstyrene and 4-methylstyrene are preferable.

In the unmodified liquid diene rubber (B'), the content of the additional monomer units other than the butadiene and isoprene units is not more than 50 mass %, more preferably not more than 40 mass %, and still more preferably not more than 30 mass %. When, for example, the content of vinyl aromatic compound (b2) units is within the above range, the processability of the rubber composition tends to be enhanced.

The unmodified liquid diene rubber (B') is preferably a polymer obtained by polymerizing a conjugated diene and optionally additional monomers other than conjugated dienes by a process such as, for example, emulsion polymerization or solution polymerization.

The emulsion polymerization process may be a known process or a process that is deemed as known. For example, monomers including a prescribed amount of the conjugated diene may be emulsified and dispersed in the presence of an emulsifier and may be emulsion polymerized with use of a radical polymerization initiator.

Examples of the emulsifiers include long-chain fatty acid salts having 10 or more carbon atoms, and rosin acid salts. Examples of the long-chain fatty acid salts include potassium salts and sodium salts of fatty acids such as capric acid, lauric acid, myristic acid, palmitic acid, oleic acid and stearic acid.

Usually, water is used as the dispersion medium. The dispersion medium may include a water-soluble organic solvent such as methanol or ethanol as long as the stability during the polymerization is not impaired.

Examples of the radical polymerization initiators include persulfate salts such as ammonium persulfate and potassium persulfate, organic peroxides and hydrogen peroxide.

To control the molecular weight of the obtainable unmodified liquid diene rubber (B'), a chain transfer agent may be used. Examples of the chain transfer agents include mercaptans such as t-dodecylmercaptan and n-dodecylmercaptan; carbon tetrachloride, thioglycolic acid, diterpene, terpinolene, γ-terpinene and α-methylstyrene dimer.

The temperature of the emulsion polymerization may be selected appropriately in accordance with, for example, the type of the radical polymerization initiator used. The temperature is usually in the range of 0 to 100° C., and preferably in the range of 0 to 60° C. The polymerization mode may be continuous or batchwise.

The polymerization reaction may be terminated by the addition of a polymerization terminator. Examples of the polymerization terminators include amine compounds such as isopropylhydroxylamine, diethylhydroxylamine and hydroxylamine, quinone compounds such as hydroquinone and benzoquinone, and sodium nitrite.

The termination of the polymerization reaction may be followed by the addition of an antioxidant as required. After the termination of the polymerization reaction, the latex obtained is cleaned of the unreacted monomers as required, and the unmodified liquid diene rubber (B') is coagulated by the addition of a coagulant salt such as sodium chloride, calcium chloride or potassium chloride optionally together with an acid such as nitric acid or sulfuric acid to control the pH of the coagulated system to a predetermined value. The dispersion medium is then separated, thereby recovering the polymer. Next, the polymer is washed with water, dehydrated and dried. In this manner, the unmodified liquid diene rubber (B') may be obtained. During the coagulation process, the latex may be mixed together with an emulsified dispersion of an extender oil as required, and the unmodified liquid diene rubber (B') may be recovered as an oil-extended rubber.

The solution polymerization process may be a known process or a process that is deemed as known. For example, monomers including the conjugated diene are polymerized in a solvent with a Ziegler catalyst, a metallocene catalyst or an active metal or an active metal compound capable of catalyzing anionic polymerization, optionally in the presence of a polar compound as desired.

Examples of the solvents include aliphatic hydrocarbons such as n-butane, n-pentane, isopentane, n-hexane, n-heptane and isooctane; alicyclic hydrocarbons such as cyclopentane, cyclohexane and methylcyclopentane; and aromatic hydrocarbons such as benzene, toluene and xylene.

Examples of the active metals capable of catalyzing anionic polymerization include alkali metals such as lithium, sodium and potassium; alkaline earth metals such as beryllium, magnesium, calcium, strontium and barium; and lanthanoid rare earth metals such as lanthanum and neodymium. Of the active metals capable of catalyzing anionic polymerization, alkali metals and alkaline earth metals are preferable, and alkali metals are more preferable.

Preferred active metal compounds capable of catalyzing anionic polymerization are organoalkali metal compounds. Examples of the organoalkali metal compounds include organomonolithium compounds such as methyllithium, ethyllithium, n-butyllithium, sec-butyllithium, t-butyllithium, hexyllithium, phenyllithium and stilbenelithium; polyfunctional organolithium compounds such as dilithiomethane, dilithionaphthalene, 1,4-dilithiobutane, 1,4-dilithio-2-ethylcyclohexane and 1,3,5-trilithiobenzene; sodium naphthalene and potassium naphthalene. Of these organoalkali metal compounds, organolithium compounds are preferable, and organomonolithium compounds are more preferable.

The amount in which the organoalkali metal compounds are used may be determined appropriately in accordance with factors such as the melt viscosities and molecular weights of the unmodified liquid diene rubber (B') and the modified liquid diene rubber (B). Usually, the amount of such compounds is 0.01 to 3 parts by mass per 100 parts by mass of all the monomers including the conjugated diene.

The organoalkali metal compound may be used in the form of an organoalkali metal amide by being subjected to a reaction with a secondary amine such as dibutylamine, dihexylamine or dibenzylamine.

The polar compounds are usually used in the anionic polymerization for the purpose of controlling the microstructure (for example, the vinyl content) of conjugated diene units without deactivating the reaction. Examples of the polar compounds include ether compounds such as dibutyl ether, tetrahydrofuran and ethylene glycol diethyl ether; tertiary amines such as N,N,N',N'-tetramethylethylenediamine and trimethylamine; alkali metal alkoxides and phosphine compounds. The polar compounds are usually used in an amount of 0.01 to 1000 mol per mol of the organoalkali metal compound.

The temperature of the solution polymerization is usually in the range of −80 to 150° C., preferably 0 to 100° C., and more preferably 10 to 90° C. The polymerization mode may be batchwise or continuous.

The polymerization reaction may be terminated by the addition of a polymerization terminator. Examples of the polymerization terminators include alcohols such as methanol and isopropanol. The unmodified liquid diene rubber (B') may be isolated by pouring the polymerization reaction liquid into a poor solvent such as methanol to precipitate the unmodified liquid diene rubber (B'), or by washing the polymerization reaction liquid with water followed by separation and drying.

Of the processes described above for the production of the unmodified liquid diene rubber (B'), the solution polymerization process is preferable.

The unmodified liquid diene rubber (B') obtained as described above may be directly (without hydrogenation) subjected to the modification with functional groups derived from a silane compound represented by the formula (1) described later, or may be modified after at least part of the unsaturated bonds present in the liquid diene rubber are hydrogenated.

To ensure that the functional groups derived from a silane compound represented by the formula (1) described later will exhibit their characteristics more favorably, the unmodified liquid diene rubber (B') is preferably free from modification with other functional groups (such as, for example, hydroxyl groups). When the unmodified liquid diene rubber (B') is free from modification with functional groups, the modified liquid diene rubber (B) that is obtained tends to attain higher stability. Further, the modified liquid diene rubber (B) that is obtained tends to exhibit higher interaction (for example, reactivity) between its functional groups derived from a silane compound represented by the formula (1) and the filler (C) (for example, silica).

The unmodified liquid diene rubber (B') is modified with a functional group derived from a silane compound represented by the formula (1) below (hereinafter, also written as the silane compound (1)) into the modified liquid diene rubber (B).

[Chem. 2]

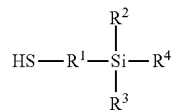

(1)

In the formula (1), $R^1$ is a $C_{1-6}$ divalent alkylene group. Examples of the $C_{1-6}$ divalent alkylene groups include methylene group, ethylene group, propylene group, butylene group, pentylene group and hexylene group. $R^2$, $R^3$ and $R^4$ are each independently a methoxy group, an ethoxy group, a phenoxy group, a methyl group, an ethyl group or a phenyl group, with the proviso that at least one of $R^2$, $R^3$ and $R^4$ is a methoxy group, an ethoxy group or a phenoxy group.

Examples of the silane compounds (1) include mercaptomethylenemethyldiethoxysilane, mercaptomethylenetriethoxysilane, 2-mercaptoethyltrimethoxysilane, 2-mercaptoethyltriethoxysilane, 2-mercaptoethylmethoxydimethylsilane, 2-mercaptoethylethoxydimethylsilane, 3-mercaptopropyltrimethoxysilane, 3-mercaptopropyltriethoxysilane, 3-mercaptopropyldimethoxymethylsilane, 3-mercaptopropyldiethoxymethylsilane, 3-mercaptopropyldimethoxyethylsilane, 3-mercaptopropyldiethoxyethylsilane, 3-mercaptopropylmethoxydimethylsilane and 3-mercaptopropylethoxydimethylsilane. The silane compounds may be used singly, or two or more may be used in combination.

The mercapto group (—SH) of the silane compound (1) is radically added to a carbon-carbon unsaturated bond present in the unmodified liquid diene rubber (B'). The resultant modified liquid diene rubber (B) has the functional group derived from the silane compound (1), specifically, a functional group that is the partial structure represented by the following formula (2):

[Chem. 3]

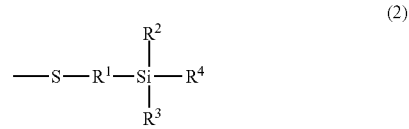

(2)

Details such as definitions and specific examples of $R^1$, $R^2$, $R^3$ and $R^4$ in the formula (2) are the same as those of $R^1$, $R^2$, $R^3$ and $R^4$ in the formula (1).

The average number of the functional groups derived from the silane compound (1) per molecule of the modified liquid diene rubber (B) is preferably 1 to 30, more preferably 1 to 25, still more preferably 1 to 20, further preferably 1 to 15, and particularly preferably 1 to 9. If the average number of the functional groups is less than 1, the rubber exhibits a low affinity for the filler (C) and fails to improve the dispersibility of the filler in the rubber composition, with the result that the desired enhancements in properties, for example, in wet grip performance and steering stability are not sometimes obtained. If, on the other hand, the average number of the functional groups is more than 30, tire treads or the like which are obtained from the rubber composition do not attain the desired properties enhancements and do tend to be deteriorated in properties, for example, in wet grip performance or steering stability.

The average number of functional groups per molecule of the modified liquid diene rubber (B) may be calculated from the functional group equivalent weight (g/eq) and the styrene equivalent number average molecular weight Mn of the modified liquid diene rubber (B).

(Average number of functional groups per molecule)=[(Number average molecular weight Mn)/(Molecular weight of styrene unit)×(Average molecular weight of units of conjugated diene and optional monomers other than conjugated dienes)]/(Functional group equivalent weight)

The functional group equivalent weight of the modified liquid diene rubber (B) indicates the mass of butadiene and optional monomers other than butadiene that are bonded together per one functional group. The functional group equivalent weight may be calculated from the ratio of the area of the peak assigned to the polymer main chains to the area of the peak assigned to the functional groups using $^1$H-NMR or $^{13}$C-NMR. The peak assigned to the functional groups is a peak assigned to alkoxy groups.

The amount of the silane compound (1) added in the modified liquid diene rubber (B) is preferably 1 to 60 parts by mass per 100 parts by mass of the unmodified liquid diene rubber (B'), and is more preferably 1 to 50 parts by mass, and still more preferably 1 to 40 parts by mass. If the amount of the modifying agent added is larger than 60 parts by mass, the modified liquid diene rubber tends not to effectively improve the dispersibility of the filler (C), and tire treads or the like which are obtained tend to be low in steering stability. If the amount is less than 1 part by mass, the dispersibility of the filler (C) tends not to be effectively improved and the desired enhancements in properties, for example, in wet grip performance and steering stability, tend to be insufficient. The amount of the silane compound (1) added in the modified liquid diene rubber (B) may be determined with various analyzers such as, for example, a nuclear magnetic resonance spectrometer.

The silane compound (1) may be added to the unmodified liquid diene rubber (B') by any method without limitation. For example, the silane compound (1) and optionally a radical catalyst as required may be added to the liquid diene rubber and the mixture may be heated in the presence of or without an organic solvent. The radical generator that is used is not particularly limited and may be any of, among others, organic peroxides, azo compounds and hydrogen peroxide that are usually available in the market. It is undesirable that the reaction which adds the silane compound (1) to the unmodified liquid diene rubber (B') be performed by heating alone without using a radical generator. If, for example, the heating temperature is excessively low, the addition reaction does not take place sufficiently and the average number of the functional groups per molecule does not sometimes reach the desired range. When the heating temperature is high, the addition reaction can proceed but is sometimes accompanied by the generation of radicals on the polymer main chains and the consequent molecular weight-increasing reaction of the polymer, with the result that the Mw of the modified liquid diene rubber does not sometimes fall in the desired range or the viscosity of the modified liquid diene rubber does not sometimes fall in the desired range. In the case where the modified liquid diene rubber is obtained by addition reaction at a high temperature, the rubber is sometimes poorly handleable, and adverse effects may be caused on properties of the tire rubber composition that is obtained. By using a radical generator in the addition reaction, the addition reaction is allowed to proceed to a sufficient extent even at a relatively low temperature while sufficiently suppressing side reactions such as molecular weight-increasing reaction.

Provided that the total area of peaks assigned to polymer components in a GPC chromatogram obtained by GPC measurement of the modified liquid diene rubber (B) is 100%, the proportion of polymer components having a molecular weight of Mt×1.45 or above is preferably in the range of 0 to 30%, more preferably in the range of 0 to 20%, still more preferably in the range of 0 to 18%, further preferably in the range of 0 to 15%, still further preferably in the range of 0 to 10%, and particularly preferably in the range of 0 to 8% wherein Mt is the peak-top molecular weight of the modified liquid diene rubber (B) measured by GPC relative to polystyrenes. The incorporation of such a modified liquid diene rubber (B) results in good processability of the rubber composition. Further, such a modified liquid diene rubber exhibits enhanced affinity for the filler (C) described later in the obtainable rubber composition and thus can be easily present near the filler (C) during the preparation of the rubber composition. Probably as a result of these, the components such as the filler (C) are allowed to be dispersed in the rubber composition in a state that is ideal for a crosslinked product to attain enhanced properties (for example, concurrent satisfaction of dry grip performance and wet grip performance). Further, the facilitated access of the modified liquid diene rubber (B) to the vicinity of the filler (C) leads to excellent abrasion resistance of crosslinked products that are obtained.

Examples of the organic peroxides include methyl ethyl ketone peroxide, cyclohexanone peroxide, 3,3,5-trimethylcyclohexanone peroxide, methylcyclohexanone peroxide, acetylacetone peroxide, 1,1-bis(t-butylperoxy)-3,3,5-trimethylcyclohexane, 1,1-bis(t-butylperoxy)-cyclohexane, 1,1-bis(t-hexylperoxy)cyclohexane, 2,2-bis(t-butylperoxy)butane, t-butylhydroperoxide, cumenehydroperoxide, diisopropylbenzene hydroperoxide, p-menthane hydroperoxide, 2,5-dimethylhexane 2,5-dihydroperoxide, 1,1,3,3-tetramethylbutyl hydroperoxide, di-t-butyl peroxide, t-butylcumyl peroxide, dicumyl peroxide, bis(t-butylperoxyisopropyl)benzene, 2,5-dimethyl-2,5-di(t-butylperoxy)hexane, 2,5-hexanoyl peroxide, lauroyl peroxide, succinic acid peroxide, benzoyl peroxide and derivatives thereof, 2,4-dichlorobenzoyl peroxide, m-toluoyl peroxide, diisopropyl peroxydicarbonate, t-butyl-2-ethyl hexanoate, di-2-ethylhexyl peroxydicarbonate, dimethoxyisopropyl peroxycarbonate, di(3-methyl-3-methoxybutyl) peroxydicarbonate, t-butyl peroxyacetate, t-butyl peroxypivalate, t-butyl peroxyneodecanoate, t-butyl peroxyoctanoate, t-butyl peroxy-3,3,5-trimethylhexanoate, t-butyl peroxylaurate, t-butyl peroxycarbonate, t-butyl peroxybenzoate and t-butyl peroxyisobutyrate.

Examples of the azo compounds include 2,2'-azobisisobutyronitrile, 1,1'-azobis(cyclohexane-1-carbonitrile), 2,2'-azobis(2-methylbutyronitrile), 2,2'-azobis(2,4-dimethylvaleronitrile), 2,2'-azobis(2,4-dimethyl-4-methoxyvaleronitrile), 2,2'-azobis(2-(2-imidazolin-2-yl)propane), 2,2'-azobis(2,4,4-trimethylpentane), 2,2'-azobis(2-methylpropane), 2,2'-azobis(2-hydroxymethylpropionitrile), 4,4'-azobis(4-cyanovaleric acid), dimethyl 2,2'-azobis(2-methylpropionate), 2-cyano-2-propylazoformamide and 2-phenylazo-4-methoxy-2,4-dimethylvaleronitrile.

For example, the organic solvent used in the above method is usually a hydrocarbon solvent or a halogenated hydrocarbon solvent. Of these organic solvents, hydrocarbon solvents such as n-butane, n-hexane, n-heptane, cyclohexane, benzene, toluene and xylene are preferable.

For purposes such as to suppress side reactions during the addition reaction of the modifying agent by the aforementioned method, an antioxidant may be added.

Some preferred examples of the antioxidants used for such purposes include 2,6-di-t-butyl-4-methylphenol (BHT), 2,2'-methylenebis(4-methyl-6-t-butylphenol), 4,4'-thiobis(3-methyl-6-t-butylphenol), 4,4'-butylidenebis(3-methyl-6-t-butylphenol) (AO-40), 3,9-bis[1,1-dimethyl-2-[3-(3-t-butyl-4-hydroxy-5-methylphenyl)propionyloxy]ethyl]-2,4,8,10-tetraoxaspiro[5.5]undecan e (AO-80), 2,4-bis[(octylthio)methyl]-6-methylphenol (Irganox 1520L), 2,4-bis[(dodecylthio)methyl]-6-methylphenol (Irganox 1726), 2-[1-(2-hydroxy-3,5-di-t-pentylphenyl)ethyl]-4,6-di-t-pent ylphenyl acrylate (Sumilizer GS), 2-t-butyl-6-(3-t-butyl-2-hydroxy-5-methylbenzyl)-4-methylphenyl acrylate (Sumilizer GM), 6-t-butyl-4-[3-(2,4,8,10-tetra-t-butyldibenzo[d,f][1,3,2]dioxaphosphepin-6-yloxy)propyl]-2-methylphenol (Sumilizer GP), tris(2,4-di-t-butylphenyl) phosphite (Irgafos 168), dioctadecyl 3,3'-dithiobispropionate, hydroquinone, p-methoxyphenol, N-phenyl-N'-(1,3-dimethylbutyl)-p-phenylenediamine (Nocrac 6C), bis(2,2,6,6-tetramethyl-4-piperidyl) sebacate (LA-77Y), N,N-dioctadecylhydroxylamine (Irgastab FS 042) and bis(4-t-octylphenyl)amine (Irganox 5057). The antioxidants may be used singly, or two or more may be used in combination.

The amount of the antioxidants added is preferably 0 to 10 parts by mass, and more preferably 0 to 5 parts by mass per 100 parts by mass of the unmodified liquid diene rubber (B').

In the modified liquid diene rubber (B), the functional groups may be introduced at polymer ends or polymer side chains. The introduction sites are preferably polymer side chains in view of the fact that a plurality of functional groups can be introduced easily. The functional groups may belong to a single kind or may be a mixture of two or more kinds. That is, the modified liquid diene rubber (B) may be modified with a single kind of the modifying agent or with two or more kinds of the modifying agents.

The ratio in which the unmodified liquid diene rubber (B') and the silane compound (1) are mixed together may be selected appropriately so that, for example, the modified liquid diene rubber (B) will have the desired average number of the functional groups per molecule. For example, the unmodified liquid diene rubber (B') and the silane compound (1) may be mixed in a mass ratio (B')/(1) of 0.3 to 300.

An effective approach to producing the modified liquid diene rubber (B) with the specified properties is to react the unmodified diene rubber with the silane compound (1) by radical addition reaction at an appropriate reaction temperature for a sufficient amount of reaction time. For example, the addition reaction of the silane compound (1) to the unmodified liquid diene rubber (B') preferably takes place at a temperature of 10 to 200° C., more preferably 50° C. to 180° C., and still more preferably 50° C. to 140° C. The reaction time is preferably 1 to 200 hours, more preferably 1 to 100 hours, still more preferably 1 to 50 hours, and further preferably 1 to 25 hours.

The melt viscosity of the modified liquid diene rubber (B) at 38° C. is preferably 0.1 to 4,000 Pa·s, more preferably 1 to 3,500 Pa·s, and still more preferably 1 to 3,000 Pa·s. When the melt viscosity of the modified liquid diene rubber (B) is in the above range, the rubber composition that is obtained attains enhanced flexibility and thus exhibits higher processability. In the present invention, the melt viscosity of the liquid diene rubber (B) is a value measured with a Brookfield viscometer at 38° C.

The weight average molecular weight (Mw) of the modified liquid diene rubber (B) is not less than 1,000 and not more than 120,000. In the invention, the Mw of the modified liquid diene rubber (B) is the weight average molecular weight measured by gel permeation chromatography (GPC) relative to polystyrenes. The above range of the Mw of the modified liquid diene rubber (B) ensures that the process flow efficiency during production is enhanced and good economic efficiency is obtained, that the rubber composition of the invention attains good processability, and that the filler (C) is dispersed in a state that is ideal for the desired enhancements in properties (for example, wet grip performance and steering stability).

In a preferred embodiment directed to attaining enhancements in rolling resistance performance and abrasion resistance, the Mw of the modified liquid diene rubber (B) is preferably not less than 1,000 and not more than 120,000, more preferably not less than 15,000 and not more than 100,000, and still more preferably not less than 15,000 and not more than 80,000.

In another preferred embodiment directed to attaining enhancements in silica dispersibility and wet grip, the Mw of the modified liquid diene rubber (B) is preferably not less than 1,000 and less than 15,000, more preferably not less than 2,000 and less than 15,000, and still more preferably not less than 3,000 and less than 15,000.

In the present invention, two or more kinds of the modified liquid diene rubbers (B) having different molecular weights Mw may be used in combination.

The molecular weight distribution (Mw/Mn) of the modified liquid diene rubber (B) is preferably 1.0 to 20.0, more preferably 1.0 to 15.0, and still more preferably 1.0 to 10.0. This Mw/Mn is advantageous in that the obtainable modified liquid diene rubber (B) has a small variation in viscosity. The molecular weight distribution (Mw/Mn) is the ratio of weight average molecular weight (Mw) to number average molecular weight (Mn) measured by GPC relative to polystyrene standards.

The vinyl content in the modified liquid diene rubber (B) is not less than 30 mol % and less than 70 mol %, preferably not less than 40 mol % and less than 70 mol %, and more preferably not less than 50 mol % and less than 70 mol %. In the present invention, the "vinyl content" means the total molar percentage of 1,2-bonded or 3,4-bonded conjugated diene units (conjugated diene units except 1,4-bonded conjugated diene units) relative to the total of isoprene units, butadiene units and conjugated diene (b1) units other than isoprene and butadiene units in the modified liquid diene rubber taken as 100 mol %. The vinyl content may be determined by $^1$H-NMR based on the area ratio of the peaks assigned to 1,2-bonded or 3,4-bonded conjugated diene units and the peak assigned to 1,4-bonded conjugated diene units.

If the vinyl content is 70 mol % or above, the modified liquid diene rubber (B) comes to exhibit a poor compatibility with the solid rubber (A) and the dispersibility of the filler (C) in the rubber composition is deteriorated. Consequently, a tire tread or the like which is obtained tends to be deteriorated in steering stability and also in wet grip performance.

The vinyl content in the modified liquid diene rubber (B) may be brought to the desired value by, for example, selecting the types of a solvent and an optional polar compound used in the production of the unmodified liquid diene rubber (B'), or controlling the production conditions such as polymerization temperature.

The glass transition temperature (Tg) of the modified liquid diene rubber (B) is variable depending on factors such as the vinyl content in the isoprene units, butadiene units and conjugated diene (b1) units, the type of the conjugated diene (b1) and the content of units derived from monomers other than the conjugated dienes, but is preferably −150 to 50° C., more preferably −130 to 50° C., and still more preferably −130 to 30° C. For example, this Tg ensures that a crosslinked product of the rubber composition gives a tire having good rolling resistance performance, and further ensures that the increase in viscosity is suppressed and the material can be handled easily.

The modified liquid diene rubbers (B) may be used singly, or two or more may be used in combination.

In the modified liquid diene rubber (B), the catalyst residue content ascribed to the polymerization catalyst used in the production of the rubber is preferably in the range of to 200 ppm in terms of metal. When, for example, the polymerization catalyst used for the production of the unmodified liquid diene rubber (B'), which is the raw material for the modified liquid diene rubber (B), is an organoalkali metal such as an organolithium compound, the metal based on which the catalyst residue content is determined is the alkali metal such as lithium. The catalyst residue content in the above range ensures that a decrease in tackiness during processing or the like will be avoided and that the rubber composition of the invention will give crosslinked products attaining enhancements in heat resistance and rolling resistance performance of tires. The catalyst residue content ascribed to the polymerization catalyst used in the production of the modified liquid diene rubber (B) is more preferably 0 to 150 ppm, and still more preferably 0 to 100 ppm in terms of metal. The catalyst residue content may be measured with, for example, a polarized Zeeman atomic absorption spectrophotometer.

For example, the catalyst residue content in the liquid diene rubber may be controlled to the above specific range by purifying the modified liquid diene rubber (B) or the unmodified liquid diene rubber (B') as the raw material to remove sufficiently the catalyst residue. The purification method is preferably washing with water or warm water, an organic solvent such as methanol or acetone, or supercritical fluid carbon dioxide. From the economic viewpoint, the number of washing operations is preferably 1 to 20 times, and more preferably 1 to 10 times. The washing temperature is preferably 20 to 100° C., and more preferably 40 to 90° C. Prior to the polymerization reaction, the monomers may be purified by distillation or with an adsorbent to remove impurities that will inhibit the polymerization. Such purification allows the polymerization to take place with a reduced amount of the polymerization catalyst, thus making it possible to reduce the catalyst residue content. From the similar viewpoint, the catalyst residue content in the inventive heavy-duty tire rubber composition including the solid rubber (A), the modified liquid diene rubber (B) and the filler (C) is preferably 0 to 200 ppm, more preferably 0 to 150 ppm, and still more preferably 0 to 100 ppm in terms of metal. In this case, the catalyst residue content may include a catalyst residue content ascribed to the polymerization catalyst used in the production of the solid rubber (A), the modified liquid diene rubber (B) and/or other components optionally used in the heavy-duty tire rubber composition.

In the rubber composition of the invention, the content of the modified liquid diene rubber (B) is 0.1 to 50 parts by mass per 100 parts by mass of the solid rubber (A), and is preferably 0.1 to 45 parts by mass, more preferably 0.5 to 40 parts by mass, still more preferably 1 to 40 parts by mass, further preferably 2 to 40 parts by mass, and particularly preferably 2 to 30 parts by mass. This content of the modified liquid diene rubber (B) ensures that the filler (C) will attain enhanced dispersibility in the rubber composition and that tire treads or the like which are obtained will exhibit excellent wet grip performance and good properties such as steering stability.

[Fillers (C)]

The filler (C) used in the heavy-duty tire rubber composition of the invention is not particularly limited and may be any of fillers generally used in heavy-duty tire rubber compositions. For example, to obtain enhanced properties such as mechanical strength and to ensure that tires including the heavy-duty tire rubber composition as portions thereof will attain enhancements in dry grip performance, wet grip performance and low fuel consumption performance, the filler (C) is preferably at least one selected from carbon blacks and silicas.

Examples of the carbon blacks include furnace blacks, channel blacks, thermal blacks, acetylene blacks and Ketjen blacks. From points of view such as enhancing the crosslinking rate, enhancing the mechanical strength of crosslinked products which are obtained, and enhancing the dry grip performance, wet grip performance and low fuel consumption performance of tires including the heavy-duty tire rubber composition as portions thereof, furnace blacks are preferable among the above carbon blacks. The carbon blacks may be used singly, or two or more may be used in combination.

To attain enhancements in dry grip performance, wet grip performance and low fuel consumption performance of tires including the heavy-duty tire rubber composition as portions thereof, the average particle diameter of the carbon blacks is preferably not less than 5 nm, more preferably not less than 10 nm, and still more preferably not less than 15 nm, and is preferably not more than 100 nm, more preferably not more than 80 nm, still more preferably not more than 70 nm, and further preferably not more than 60 nm. The average particle diameter of the carbon blacks may be determined by measuring the diameters of the particles with a transmission electron microscope and calculating the average of the diameters.

Examples of the commercially available furnace blacks include "DIABLACK" manufactured by Mitsubishi Chemical Corporation and "SEAST" manufactured by Tokai Carbon Co., Ltd. Examples of the commercially available acetylene blacks include "DENKA BLACK" manufactured by Denka Company Limited. Examples of the commercially available Ketjen blacks include "ECP600JD" manufactured by Lion Specialty Chemicals Co., Ltd.

To attain enhancements in properties such as the wettability and dispersibility with respect to the solid rubber (A), the carbon blacks may be treated with acids such as nitric acid, sulfuric acid, hydrochloric acid and mixed acids of these acids, or may be subjected to surface oxidation treatment by heating in the presence of air. To enhance the mechanical strength of the inventive heavy-duty tire rubber composition and crosslinked products obtained from the composition, the carbon blacks may be heat treated at 2,000 to 3,000° C. in the presence of a graphitization catalyst. Preferred examples of the graphitization catalysts include boron, boron oxides (for example, $B_2O_2$, $B_2O_3$, $B_4O_3$ and $B_4O_5$), boron oxoacids (for example, orthoboric acid, metaboric acid and tetraboric acid) and salts thereof, boron carbides (for example, $B_4C$ and $B_6C$), boron nitride (BN) and other boron compounds.

The carbon blacks may be used after their grain size is adjusted by a technique such as crushing. Examples of the grinders which may be used for the crushing of the carbon blacks include high-speed rotary crushers (hammer mills, pin mills and cage mills), various ball mills (rotary mills, vibration mills and planetary mills) and stirring mills (bead mills, Attritor mills, flow tube type mills and annular mills).

Examples of the silicas include wet silicas (hydrous silicates), dry silicas (silicic anhydrides), calcium silicates and aluminum silicates. Of these silicas, wet silicas are preferable to attain further enhancements in processability, the mechanical strength and abrasion resistance of crosslinked products which are obtained, and the dry grip performance, wet grip performance and low fuel consumption performance of tires including the heavy-duty tire rubber composition as portions thereof. The silicas may be used singly, or two or more may be used in combination.

To attain enhancements in the processability of the heavy-duty tire rubber composition, and the dry grip performance, wet grip performance and low fuel consumption performance of tires including the heavy-duty tire rubber composition as portions thereof, the average particle diameter of the silicas is preferably not less than 0.5 nm, more preferably not less than 2 nm, still more preferably not less than 5 nm, further preferably not less than 8 nm, and particularly preferably not less than 10 nm, and is preferably not more than 200 nm, more preferably not more than 150 nm, still more preferably not more than 100 nm, further preferably not more than 50 nm, particularly preferably not more than 30 nm, and most preferably not more than 20 nm. The average particle diameter of the silicas may be determined by measuring the diameters of the particles with a transmission electron microscope and calculating the average of the diameters.

Of the carbon blacks and the silicas described above, the silicas are more preferable as the fillers (C) from points of view such as enhancing the rolling resistance performance of the obtainable rubber composition and crosslinked products thereof.

In the present invention, the heavy-duty tire rubber composition may include a filler other than silicas and carbon blacks for purposes such as to enhance the mechanical strength of tires including the rubber composition as portions thereof, and to improve production costs by adding the filler as an extender.

Examples of the fillers other than silicas and carbon blacks include organic fillers, and inorganic fillers such as clays, talcs, micas, calcium carbonate, magnesium hydroxide, aluminum hydroxide, barium sulfate, titanium oxides, glass fibers, fibrous fillers and glass balloons. These fillers may be used singly, or two or more may be used in combination.

The amount of the filler (C) is 20 to 200 parts by mass, and preferably 20 to 150 parts by mass per 100 parts by mass of the solid rubber (A). When the amount of the filler (C) is in this range, tires including the heavy-duty tire rubber composition as portions thereof attain enhancements in dry grip performance, wet grip performance and low fuel consumption performance. From the above point of view, the amount of the filler (C) per 100 parts by mass of the solid rubber (A) is more preferably not less than 30 parts by mass, and still more preferably not less than 40 parts by mass, and is preferably not more than 120 parts by mass, more preferably not more than 100 parts by mass, still more preferably not more than 90 parts by mass, and even more preferably not more than 80 parts by mass.

When the silica is used as the filler (C), the amount of the silica per 100 parts by mass of the solid rubber (A) is preferably not less than 20 parts by mass, more preferably not less than 25 parts by mass, still more preferably not less than 30 parts by mass, further preferably not less than 35 parts by mass, and particularly preferably not less than 40 parts by mass, and is preferably not more than 100 parts by mass, more preferably not more than 90 parts by mass, and still more preferably not more than 80 parts by mass, from the point of view of enhancing the dry grip performance, wet grip performance and low fuel consumption performance of tires including the heavy-duty tire rubber composition as portions thereof.

When the carbon black is used as the filler (C), the amount of the carbon black per 100 parts by mass of the solid rubber (A) is preferably not less than 10 parts by mass, more preferably not less than 20 parts by mass, still more preferably not less than 30 parts by mass, and particularly preferably not less than 40 parts by mass, and is preferably not more than 120 parts by mass, more preferably not more than 100 parts by mass, and still more preferably not more than 80 parts by mass, from the point of view of enhancing the dry grip performance, wet grip performance and low fuel consumption performance of tires including the heavy-duty tire rubber composition as portions thereof.

When the silica and the carbon black are used in combination, the ratio of the silica to the carbon black (mass ratio=silica/carbon black) is preferably 1/99 to 99/1, more preferably 10/90 to 90/10, and still more preferably 30/70 to 80/20.

[Additional Components]

When the heavy-duty tire rubber composition of the invention includes silica or the like as the filler (C), it is preferable that the composition further include a silane coupling agent. Examples of the silane coupling agents include sulfide compounds, mercapto compounds, vinyl compounds, amino compounds, glycidoxy compounds, nitro compounds and chloro compounds.

Examples of the sulfide compounds include bis(3-triethoxysilylpropyl) tetrasulfide, bis(2-triethoxysilylethyl) tetrasulfide, bis(3-trimethoxysilylpropyl) tetrasulfide, bis(2-trimethoxysilylethyl) tetrasulfide, bis(3-triethoxysilylpropyl) trisulfide, bis(3-trimethoxysilylpropyl) trisulfide, bis(3-triethoxysilylpropyl) disulfide, bis(3-trimethoxysilylpropyl) disulfide, 3-trimethoxysilylpropyl-N,N-dimethylthiocarbamoyl tetrasulfide, 3-triethoxysilylpropyl-N,N-dimethylthiocarbamoyl tetrasulfide, 2-trimethoxysilylethyl-N,N-dimethylthiocarbamoyl tetrasulfide, 3-trimethoxysilylpropyl benzothiazole tetrasulfide, 3-triethoxysilylpropyl benzothiazole tetrasulfide, 3-triethoxysilylpropyl methacrylate monosulfide, 3-trimethoxysilylpropyl methacrylate monosulfide and 3-octanoylthio-1-propyltriethoxysilane.

Examples of the mercapto compounds include 3-mercaptopropyltrimethoxysilane, 3-mercaptopropyltriethoxysilane, 2-mercaptoethyltrimethoxysilane and 2-mercaptoethyltriethoxysilane.

Examples of the vinyl compounds include vinyltriethoxysilane and vinyltrimethoxysilane.

Examples of the amino compounds include 3-aminopropyltriethoxysilane, 3-aminopropyltrimethoxysilane, 3-(2-aminoethyl)aminopropyltriethoxysilane and 3-(2-aminoethyl)aminopropyltrimethoxysilane.

Examples of the glycidoxy compounds include γ-glycidoxypropyltriethoxysilane, γ-glycidoxypropyltrimethoxysilane, γ-glycidoxypropylmethyldiethoxysilane and γ-glycidoxypropylmethyldimethoxysilane.

Examples of the nitro compounds include 3-nitropropyltrimethoxysilane and 3-nitropropyltriethoxysilane.

Examples of the chloro compounds include 3-chloropropyltrimethoxysilane, 3-chloropropyltriethoxysilane, 2-chloroethyltrimethoxysilane and 2-chloroethyltriethoxysilane.

Other compounds may be also used, with examples including octyltriethoxysilane, methyltriethoxysilane, methyltrimethoxysilane and hexadecyltrimethoxysilane.

The silane coupling agents may be used singly, or two or more may be used in combination. Of the above silane coupling agents, sulfur-containing silane coupling agents such as sulfide compounds and mercapto compounds are preferable because of their high reinforcing effects, and bis(3-triethoxysilylpropyl) disulfide, bis(3-triethoxysilylpropyl) tetrasulfide and 3-mercaptopropyltrimethoxysilane are more preferable.

The silane coupling agent is preferably added in an amount of 0.1 to 30 parts by mass, more preferably 0.5 to 20 parts by mass, and still more preferably 1 to 15 parts by mass per 100 parts by mass of the filler (C). This content of the silane coupling agent ensures that dispersibility, coupling effects, reinforcing effects and abrasion resistance will be enhanced.

The heavy-duty tire rubber composition of the invention may further contain a vulcanizing agent (D) to crosslink the rubber in the composition. Examples of the vulcanizing agents (D) include sulfur and sulfur compounds. Examples of the sulfur compounds include morpholine disulfides and alkylphenol disulfides. The vulcanizing agents (D) may be used singly, or two or more may be used in combination. From the point of view of mechanical properties of crosslinked products, the vulcanizing agent (D) is usually added in an amount of 0.1 to 10 parts by mass, preferably 0.5 to 10 parts by mass, and more preferably 0.8 to 5 parts by mass per 100 parts by mass of the solid rubber (A).

When, for example, the heavy-duty tire rubber composition of the invention contains the vulcanizing agent (D) for crosslinking (vulcanizing) the rubber, the composition may further include a vulcanization accelerator (E). Examples of the vulcanization accelerators (E) include guanidine compounds, sulfenamide compounds, thiazole compounds, thiuram compounds, aldehyde-amine compounds, aldehyde-ammonia compounds, imidazoline compounds and xanthate compounds. The vulcanization accelerators (E) may be used singly, or two or more may be used in combination. The vulcanization accelerator (E) is usually added in an amount of 0.1 to 15 parts by mass, and preferably 0.1 to 10 parts by mass per 100 parts by mass of the solid rubber (A).

When, for example, the heavy-duty tire rubber composition of the invention contains sulfur, a sulfur compound or the like as the vulcanizing agent (D) for crosslinking (vulcanizing) the rubber, the composition may further include a vulcanization aid (F). Examples of the vulcanization aids (F) include fatty acids such as stearic acid, metal oxides such as zinc oxide, and fatty acid metal salts such as zinc stearate. The vulcanization aids (F) may be used singly, or two or more may be used in combination. The vulcanization aid (F) is usually added in an amount of 0.1 to 15 parts by mass, and preferably 1 to 10 parts by mass per 100 parts by mass of the solid rubber (A).

Besides the vulcanizing agents, crosslinking agents may be added to the heavy-duty tire rubber composition. Examples of the crosslinking agents include oxygen, organic peroxides, phenolic resins, amino resins, quinone and quinone dioxime derivatives, halogen compounds, aldehyde compounds, alcohol compounds, epoxy compounds, metal halides, organometal halides and silane compounds. These may be used singly, or two or more may be used in combination. The amount of the crosslinking agent is preferably 0.1 to 10 parts by mass per 100 parts by mass of the solid rubber (A).

Where necessary, the heavy-duty tire rubber composition of the invention may include a softener in order to attain improvements in properties such as processability and fluidity while still ensuring that the advantageous effects of the invention are not impaired. Examples of the softeners include process oils such as silicone oils, aromatic oils, TDAEs (treated distilled aromatic extracts), MESs (mild extracted solvates), RAEs (residual aromatic extracts), paraffin oils and naphthenic oils, resin components such as aliphatic hydrocarbon resins, alicyclic hydrocarbon resins, C9 resins, rosin resins, coumarone-indene resins and phenolic resins, and liquid polymers such as low-molecular polybutadienes, low-molecular polyisoprenes, low-molecular styrene butadiene copolymers and low-molecular styrene isoprene copolymers. When the heavy-duty tire rubber composition of the invention contains the process oils, the resins and the liquid polymers as the softeners, the content thereof from the point of view of bleeding resistance is preferably not more than 50 parts by mass, more preferably not more than 30 parts by mass, and still more preferably not more than 15 parts by mass per 100 parts by mass of the solid rubber (A).

The heavy-duty tire rubber composition of the invention may contain additives as required in order to attain enhancements in properties such as weather resistance, heat resistance and oxidation resistance, while still achieving the advantageous effects of the invention. Examples of such additives include antioxidants, oxidation inhibitors, waxes, lubricants, light stabilizers, scorch inhibitors, processing aids, colorants such as pigments and coloring matters, flame retardants, antistatic agents, matting agents, antiblocking agents, UV absorbers, release agents, foaming agents, antibacterial agents, mildew-proofing agents and perfumes.

Examples of the oxidation inhibitors include hindered phenol compounds, phosphorus compounds, lactone compounds and hydroxyl compounds.

Examples of the antioxidants include amine-ketone compounds, imidazole compounds, amine compounds, phenolic compounds, sulfur compounds and phosphorus compounds. The additives may be used singly, or two or more may be used in combination.

[Methods for Producing Heavy-Duty Tire Rubber Compositions]

The heavy-duty tire rubber composition of the invention may be produced by any methods without limitation as long as the components described hereinabove can be mixed together homogeneously. Examples of the apparatuses used in the production of the heavy-duty tire rubber composition include tangential or intermeshing internal kneaders such as kneader-ruders, Brabender mixers, Banbury mixers and internal mixers, single-screw extruders, twin-screw extruders, mixing rolls and rollers. The production of the rubber composition may be usually carried out at a temperature in the range of 70 to 270° C.

The heavy-duty tire rubber composition of the invention is preferably used as a crosslinked product (vulcanized rubber) by being crosslinked. The vulcanization conditions and methods are not particularly limited, but the composition is preferably vulcanized with a vulcanization mold under conditions where the vulcanization temperature is 120 to 200° C. and the vulcanization pressure is 0.5 to 20 MPa.

The crosslinked products are preferably such that the modified liquid diene rubber (B) is extracted therefrom with an extraction ratio of not more than 20 mass %, more preferably not more than 15 mass %, and still more preferably not more than 10 mass %.

The extraction ratio may be calculated by soaking 2 g of the crosslinked product into 400 ml of toluene at 23° C. for 48 hours and determining the amount of the modified liquid diene rubber (B) extracted into toluene.

[Tire Treads and Pneumatic Tires]

The tire tread of the present invention includes the heavy-duty tire rubber composition as at least a portion thereof, and exhibits excellent wet grip performance and steering stability. The structure of the tire tread of the invention is not particularly limited, and may be a monolayer structure or a multilayer structure. In the case of a multilayer structure, the heavy-duty tire rubber composition is preferably used in the layer that is placed in contact with the road surface.

The pneumatic tire of the present invention includes the heavy-duty tire rubber composition as at least a portion thereof, and is, in particular, preferably a pneumatic tire including the tire tread described above. The pneumatic tire of the invention, by virtue of its containing the heavy-duty tire rubber composition as a portion thereof, is excellent in wet grip performance and enhanced in steering stability.

Examples of the portions of tires in which the rubber composition and crosslinked products of the rubber composition may be used include treads (cap treads, undertreads), sidewalls, rubber reinforcing layers (such as liners) for runflat tires, rim cushions, bead fillers, bead insulations, bead apexes, clinch apexes, belts, belt cushions, breakers, breaker cushions, chafers, chafers pads and strip apexes.

EXAMPLES

The present invention will be described in further detail by presenting Examples hereinbelow without limiting the scope of the invention to such Examples.

The following are the components used in Examples and Comparative Examples.

<Solid Rubbers (A)>
Natural rubber: STR20 (natural rubber from Thailand)
Butadiene rubber: BR01 (manufactured by JSR Corporation, Mw: 550,000, cis content: 95 mass %)

<Modified Liquid Diene Rubbers (B)>
Modified liquid polybutadiene obtained in Production Example 1 described later and liquid diene rubber obtained in Production Example 2 described later <Fillers (C)>
Silica: ULTRASIL 7000GR (manufactured by Evonik Degussa Japan, wet silica, average particle diameter: 14 nm)
Carbon black: DIABLACK I (manufactured by Mitsubishi Chemical Corporation, average particle diameter: 20 nm)

<Vulcanizing Agent (D)>
Sulfur (sulfur fine powder 200 mesh manufactured by Tsurumi Chemical Industry Co., Ltd.)

<Vulcanization Accelerators (E)>
Vulcanization accelerator (1): Nocceler CZ-G (manufactured by Ouchi Shinko Chemical Industrial Co., Ltd.) Vulcanization accelerator (2): Nocceler D (manufactured by Ouchi Shinko Chemical Industrial Co., Ltd.)

<Vulcanization Aids (F)>
Stearic acid: LUNAC S-20 (manufactured by Kao Corporation)
Zinc oxide: Zinc oxide (manufactured by Sakai Chemical Industry Co., Ltd.)

<Optional Components>
TDAE: VivaTec 500 (manufactured by H&R)
Silane coupling agent: Si-75 (manufactured by Evonik Degussa Japan)
Antioxidant (1): ANTAGE RD (manufactured by Kawaguchi Chemical Industry Co., LTD.)
Antioxidant (2): Nocrac 6C (manufactured by Ouchi Shinko Chemical Industrial Co., Ltd.)

Production Example 1: Production of Modified Liquid Diene Rubber (B-1)

A thoroughly dried 5 L autoclave was purged with nitrogen and was loaded with 1150 g of hexane and 154 g of n-butyllithium (a 17 mass % hexane solution). The temperature was increased to 50° C. While performing stirring, 10 g of N,N,N',N'-tetramethylethylenediamine and 1250 g of butadiene were added stepwise while controlling the polymerization temperature at 50° C. Under such conditions, the polymerization was performed for 1 hour. The polymerization reaction was terminated by the addition of methanol. A polymer solution was thus obtained. Water was added to the polymer solution, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford an unmodified liquid diene rubber (B'-1).

Subsequently, a 1 L-volume autoclave was loaded with 700 g of the unmodified liquid diene rubber (B'-1) obtained above, and the system was deaerated with nitrogen while performing stirring at 60° C. for 3 hours. There were added 0.2 g of 1,1-bis(t-hexylperoxy)cyclohexane and 130 g of (3-mercaptopropyl)triethoxysilane. The reaction was performed at 105° C. for 8 hours. A modified liquid diene rubber (B-1) was thus obtained.

Production Example 2: Production of Liquid Diene Rubber (B'-2)

A thoroughly dried 5 L autoclave was purged with nitrogen and was loaded with 1150 g of hexane and 154 g of n-butyllithium (a 17 mass % hexane solution). The temperature was increased to 50° C. While performing stirring, 10 g of N,N,N',N'-tetramethylethylenediamine and 1250 g of butadiene were added stepwise while controlling the polymerization temperature at 50° C. Under such conditions, the polymerization was performed for 1 hour. The polymerization reaction was terminated by the addition of methanol. A polymer solution was thus obtained. Water was added to the polymer solution, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford a liquid diene rubber (B'-2).

Properties of the modified liquid diene rubber and other material obtained in Production Examples were measured and calculated by the following methods.

(Method for Measuring Weight Average Molecular Weight)
The Mw of the modified liquid diene rubbers (B) was measured by GPC (gel permeation chromatography) relative to standard polystyrenes. The measurement involved the following apparatus and conditions.

Apparatus: GPC apparatus "GPC 8020" manufactured by TOSOH CORPORATION
Separation column: "TSKgel G4000HXL" manufactured by TOSOH CORPORATION
Detector: "RI-8020" manufactured by TOSOH CORPORATION
Eluent: Tetrahydrofuran
Fluent flow rate: 1.0 mL/min
Sample concentration: 5 mg/10 mL
Column temperature: 40° C.

(Vinyl Content)
The vinyl content of the modified liquid diene rubbers (B) was measured with $^1$H-NMR (500 MHz) manufactured by JEOL Ltd. The concentration was sample/deuterated chloroform=50 mg/1 mL. The number of scans was 1024. With respect to the spectrum obtained, the vinyl content was calculated from the ratio of the area of the double-bond peak assigned to the vinylated diene compound to the area of the double-bond peak assigned to the non-vinylated diene compound.

(Glass Transition Temperature)
A 10 mg portion of the modified liquid diene rubber (B) was placed into an aluminum pan and was analyzed by differential scanning calorimetry (DSC) at a heat-up rate of 10° C./min. With respect to the thermogram obtained, the peak top value of the DDSC curve was adopted as the glass transition temperature (Tg).

(Method for Measuring Melt Viscosity at 38° C.)
The melt viscosity of the modified liquid diene rubbers (B) at 38° C. was measured with a Brookfield viscometer (manufactured by BROOKFIELD ENGINEERING LABS. INC.).

(Average Number of Functional Groups Per Molecule of Modified Liquid Diene Rubber (B))
The average number of functional groups per molecule of the modified liquid diene rubber (B) may be calculated from the functional group equivalent weight (g/eq) and the styrene equivalent number average molecular weight Mn of the modified liquid diene rubber (B).

(Average number of functional groups per molecule)=[(Number average molecular weight Mn)/(Molecular weight of styrene unit)×(Average molecular weight of units of conjugated diene and optional monomers other than conjugated dienes)]/(Functional group equivalent weight)

The functional group equivalent weight of the modified liquid diene rubber (B) indicates the mass of butadiene and optional monomers other than butadiene that are bonded together per one functional group. The functional group equivalent weight may be calculated from the ratio of the area of the peak assigned to the functional groups to the area of the peak assigned to the polymer main chains using $^1$H-NMR or $^{13}$C-NMR. The peak assigned to the functional groups is a peak assigned to alkoxy groups.

Table 1 below describes the properties of the modified liquid diene rubber (B-1) obtained in Production Example 1 and the liquid diene rubber (B'-2) obtained in Production Example 2.

TABLE 1

|  | Weight average molecular weight (×10$^3$) | Vinyl content (mol %) | Tg (° C.) | Melt viscosity (38° C.) (Pa · s) | Average number of functional groups per molecule (groups) |
|---|---|---|---|---|---|
| Modified liquid diene rubber (B-1) | 6 | 65 | −46 | 5 | 2 |
| Liquid diene rubber (B'-2) | 6 | 65 | −49 | 5 | 0 |

Example 1 and Comparative Examples 1 to 3

The solid rubbers (A), the modified liquid diene rubber (B), the fillers (C), TDAE, the silane coupling agent, zinc oxide, stearic acid, and the antioxidants were added in the amounts (parts by mass) described in Table 2 into an internal Banbury mixer and were kneaded together for 6 minutes from a start temperature of 60° C. to a resin temperature of 150° C. Thereafter, the kneaded mixture was removed from the mixer and was cooled to room temperature. Next, the mixture was placed into the Banbury mixer again, and the vulcanizing agent (sulfur) and the vulcanization accelerators were added. The resultant mixture was kneaded at 100° C. for 75 seconds. A rubber composition was thus obtained.

The rubber composition obtained was subjected to press forming (145° C., 20 to 30 minutes) to give a vulcanized rubber sheet (2 mm in thickness). The rolling resistance performance (low fuel consumption performance), the wet grip performance, the steering stability and the hardness were evaluated by the methods described below. The results are described in Table 2.

The measurement methods for evaluations are described below.

(Rolling Resistance Performance)

The sheet of the rubber composition prepared in Example or Comparative Example was cut to give a test piece 40 mm in length and 5 mm in width. The test piece was tested on a dynamic viscoelastometer manufactured by GABO GmbH at a measurement temperature of 60° C., a frequency of 10 Hz, a static strain of 10% and a dynamic strain of 2% to determine tan δ as an index of rolling resistance performance. The data obtained in Examples and Comparative Examples are values relative to the value of Comparative Example 1 in Table 2 taken as 100. The smaller the value, the higher the rolling resistance performance of the rubber composition.

(Wet Grip Performance)

The sheet of the rubber composition prepared in Example or Comparative Example was cut to give a test piece 40 mm in length and 5 mm in width. The test piece was tested on a dynamic viscoelastometer manufactured by GABO GmbH at a measurement temperature of 0° C., a frequency of 10 Hz, a static strain of 10% and a dynamic strain of 2% to determine tan δ as an index of wet grip performance. The data obtained in Examples and Comparative Examples are values relative to the value of Comparative Example 1 in Table 2 taken as 100. The larger the value, the more excellent the wet grip performance of the rubber composition.

(Steering Stability)

The sheet of the rubber composition prepared in Example or Comparative Example was cut to give a test piece 40 mm in length and 5 mm in width. The test piece was tested on a dynamic viscoelastometer manufactured by GABO GmbH at a measurement temperature of 25° C. or 70° C., a frequency of 10 Hz, a static strain of 10% and a dynamic strain of 2% to determine E' as an index of steering stability. The data obtained in Example and Comparative Examples are values relative to the value of Comparative Example 1 in Table 2 taken as 100. With increasing magnitude of the value, the rubber composition exhibits more excellent steering stability when used as tires.

(Hardness)

The sheet of the rubber composition prepared in Example or Comparative Example was cut to give a test piece 40 mm in length and 5 mm in width. The test piece was analyzed with a Type-A hardness meter in accordance with JIS K6253 to measure the hardness. The data obtained in Example and Comparative Examples are values relative to the value of Comparative Example 1 in Table 2 taken as 100. With increasing magnitude of the value, the rubber composition has a higher hardness and is more preferable.

TABLE 2

|  |  |  | Example | Comparative Examples | | |
|---|---|---|---|---|---|---|
|  |  |  | 1 | 1 | 2 | 3 |
| Amounts (parts by mass) | Components (A) | Natural rubber | 70 | 70 | 70 | 70 |
|  |  | Butadiene rubber | 30 | 30 | 30 | 30 |
|  | Components (B) | Modified liquid diene rubber (B-1) | 6 |  |  |  |
|  |  | Liquid diene rubber (B'-2) |  |  |  | 6 |
|  | Components (C) | Silica | 60 | 60 | 60 | 60 |
|  |  | Carbon black | 10 | 10 | 10 | 10 |
|  | Optional components | TDAE | 4 | 4 | 10 | 4 |
|  |  | Silane coupling agent | 4.8 | 4.8 | 4.8 | 4.8 |
|  |  | Zinc oxide | 3.5 | 3.5 | 3.5 | 3.5 |
|  |  | Stearic acid | 2.0 | 2.0 | 2.0 | 2.0 |

TABLE 2-continued

|  | Example | Comparative Examples | | |
|---|---|---|---|---|
|  | 1 | 1 | 2 | 3 |
| Antioxidant (1) | 1.0 | 1.0 | 1.0 | 1.0 |
| Antioxidant (2) | 1.5 | 1.5 | 1.5 | 1.5 |
| Sulfur | 2.0 | 2.0 | 2.0 | 2.0 |
| Vulcanization accelerator (1) | 1.5 | 1.5 | 1.5 | 1.5 |
| Vulcanization accelerator (2) | 1.0 | 1.0 | 1.0 | 1.0 |
| Rolling resistance performance (tanδ at 60° C.) (relative value) | 102 | 100 | 100 | 107 |
| Wet grip performance (tanδ at 0° C.) (relative value) | 110 | 100 | 102 | 103 |
| Steering stability (E' at 25° C.) (relative value) | 110 | 100 | 89 | 88 |
| Steering stability (E' at 70° C.) (relative value) | 107 | 100 | 90 | 87 |
| Hardness (relative value) | 103 | 100 | 97 | 95 |

INDUSTRIAL APPLICABILITY

The rubber compositions of the present invention have excellent processability and filler dispersibility. Further, when rendered crosslinkable by the addition of a crosslinking agent or the like, the rubber compositions give crosslinked products with excellent properties. Thus, the compositions of the present invention may be suitably used in applications such as tires. In particular, the crosslinked products, etc. are useful as tire treads or the like not only because wet grip performance is enhanced but also because enhanced steering stability can be achieved. Further, the rubber compositions have increased hardness and are resistant to rubber deformation, and thus can be suitably used also in bead fillers and tire belts.

The invention claimed is:

1. A heavy-duty tire rubber composition, comprising:
100 parts by mass of a solid rubber (A),
0.1 to 50 parts by mass of a modified liquid diene rubber (B), the modified liquid diene rubber (B) comprising a functional group derived from a silane compound, and
20 to 200 parts by mass of a filler (C),
wherein the solid rubber (A) comprises 60 mass % or more of a natural rubber, and
wherein the modified liquid diene rubber (B) satisfies the following conditions (i) and (ii):
(i) a weight average molecular weight is not less than 1,000 and not more than 120,000, and
(ii) a vinyl content is not less than 30 mol % and less than 70 mol %, and
the silane compound is a compound of formula (1):

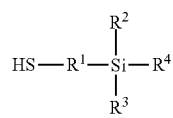

(1)

wherein $R^1$ is a $C_{1-6}$ divalent alkylene group, and $R^2$, $R^3$ and $R^4$ are each independently a methoxy group, an ethoxy group, a phenoxy group, a methyl group, an ethyl group or a phenyl group, wherein at least one of $R^2$, $R^3$ and $R^4$ is a methoxy group, an ethoxy group or a phenoxy group.

2. The heavy-duty tire rubber composition according to claim 1, wherein a melt viscosity of the modified liquid diene rubber (B) at 38° C. is 0.1 to 4,000 Pa·s.

3. The heavy-duty tire rubber composition according to claim 1, wherein the modified liquid diene rubber (B) is a polymer comprising a monomer unit derived from isoprene and/or butadiene.

4. The heavy-duty tire rubber composition according to claim 1, wherein the filler (C) is at least one selected from the group consisting of a silica and a carbon black.

5. The heavy-duty tire rubber composition according to claim 4,
wherein the filler (C) is a carbon black having an average particle diameter of 5 to 100 nm and/or a silica having an average particle diameter of 0.5 to 200 nm.

6. The heavy-duty tire rubber composition according to claim 4,
wherein the filler (C) is silica, and
the heavy-duty tire rubber composition further comprises:
0.1 to 30 parts by mass of a silane coupling agent per 100 parts by mass of the silica.

7. The heavy-duty tire rubber composition according to claim 1, wherein the solid rubber (A) is one or more selected from the group consisting of a natural rubber, a styrene butadiene rubber, a butadiene rubber and an isoprene rubber.

8. A crosslinked product, obtained by crosslinking the heavy-duty tire rubber composition described in claim 1.

9. A tire tread, comprising:
the heavy-duty tire rubber composition described in claim 1.

10. A bead filler, comprising:
the heavy-duty tire rubber composition described in claim 1.

11. A tire belt, comprising:
the heavy-duty tire rubber composition described in claim 1.

12. A heavy-duty tire, comprising:
the heavy-duty tire rubber composition described in claim 1.

* * * * *